United States Patent
Kokuma (10) Patent No.: US 9,712,709 B2
(45) Date of Patent: Jul. 18, 2017

(54) DOCUMENT IMAGE CAPTURING DEVICE

(71) Applicant: PFU LIMITED, Kahoku-shi, Ishikawa (JP)

(72) Inventor: Keisuke Kokuma, Kahoku (JP)

(73) Assignee: PFU Limited, Kahoku-shi, Ishikawa (JP)

( * ) Notice: Subject to any disclaimer, the term of this patent is extended or adjusted under 35 U.S.C. 154(b) by 0 days.

(21) Appl. No.: 15/174,888

(22) Filed: Jun. 6, 2016

(65) Prior Publication Data
US 2017/0142281 A1  May 18, 2017

(30) Foreign Application Priority Data

Nov. 18, 2015 (JP) .................................. 2015-225732

(51) Int. Cl.
| | |
|---|---|
| *H04N 1/04* | (2006.01) |
| *H04N 1/00* | (2006.01) |
| *H04N 1/028* | (2006.01) |
| *H04N 1/193* | (2006.01) |

(52) U.S. Cl.
CPC ..... *H04N 1/00909* (2013.01); *H04N 1/02815* (2013.01); *H04N 1/193* (2013.01); *H04N 2201/04* (2013.01)

(58) Field of Classification Search
None
See application file for complete search history.

(56) References Cited

U.S. PATENT DOCUMENTS

| | | | | |
|---|---|---|---|---|
| 6,355,078 B1 * | 3/2002 | Wickland | ........... | B01D 46/0032 55/364 |
| 7,667,877 B2 * | 2/2010 | Morimoto | .......... | H04N 1/00588 358/474 |
| 8,493,640 B2 * | 7/2013 | Tamehira | ............... | H04N 1/123 358/474 |
| 8,705,150 B2 * | 4/2014 | Shirai | ................ | H04N 1/00596 358/474 |
| 2010/0053701 A1 * | 3/2010 | Yoshida | ............. | H04N 1/00525 358/474 |

(Continued)

FOREIGN PATENT DOCUMENTS

| | | |
|---|---|---|
| JP | 2007-201888 A | 8/2007 |
| JP | 2012-39207 A | 2/2012 |
| JP | 2012-39207 A | 2/2013 |

*Primary Examiner* — Cheukfan Lee
(74) *Attorney, Agent, or Firm* — Lewis Roca Rothgerber Christie LLP (57) ABSTRACT

A document image capturing device includes an image capturing module for capturing an image of a document, and a first aperture portion, an illumination module movable between the image capturing module and a document conveying path and including a light source for illuminating the document and a second aperture portion, and a sealer for sealing between the first aperture portion and the second aperture portion regardless of movement of the illumination module. The sealer includes a first film attached to cover an entire periphery of the first aperture portion and a second film attached to cover an entire periphery of the second aperture portion, and the first aperture portion and the second aperture portion are arranged so that a reflection light from the document illuminated by the light source passes through the first aperture portion and the second aperture portion.

5 Claims, 9 Drawing Sheets

(56) References Cited

U.S. PATENT DOCUMENTS

| | | | |
|---|---|---|---|
| 2011/0176188 A1* | 7/2011 | Tamehira | G03G 15/605 358/498 |
| 2012/0008155 A1* | 1/2012 | Nakanishi | H04N 1/121 358/1.9 |
| 2012/0026562 A1* | 2/2012 | Yoshimoto | G03G 15/605 358/498 |
| 2012/0033270 A1 | 2/2012 | Tamehira et al. | |
| 2014/0226191 A1* | 8/2014 | Enomoto | H04N 1/00588 358/496 |
| 2015/0222777 A1* | 8/2015 | Enomoto | H04N 1/123 358/496 |
| 2015/0288842 A1* | 10/2015 | Enomoto | H04N 1/00989 358/474 |
| 2015/0288844 A1* | 10/2015 | Enomoto | H04N 1/00551 358/474 |
| 2015/0334263 A1* | 11/2015 | Chubachi | H04N 1/02815 358/475 |

* cited by examiner

DOCUMENT IMAGE CAPTURING DEVICE

CROSS-REFERENCE TO RELATED APPLICATIONS

This application is based upon and claims the benefit of priority of prior Japanese Patent Application No. 2015-225732, filed on Nov. 18, 2015, the entire contents of which are incorporated herein by reference.

FIELD OF THE INVENTION

Embodiments discussed in the present specification relate to document image capturing technology.

BACKGROUND

When dust is accumulated on an image capturing module or an illumination module in a document image capturing device such as a scanner having the image capturing module, the illumination module, etc., for capturing an image of a document, vertical noise, etc., occurs in the read image, and therefore, the document image capturing device is required to have a high degree of dust proof performance. On the other hand, in the document image capturing device, not only PPC (Plain Paper Copier) paper but also thick media such as thick paper, card, etc., may be used as documents. In such a document image capturing device, the image capturing module or the illumination module is provided to be movable in accordance with the thickness of a conveyed document, so that thick media such as thick paper, a card, etc., are reliably conveyed.

In the past, in such document image capturing device, a deformable sponge member is filled between the image capturing module and the illumination module to prevent any dust from entering therein. However, when the image capturing module or the illumination module is repeatedly moved, the sponge member is deformed, and this changes the load that is generated when the image capturing module or the illumination module moves, and makes it impossible to correctly convey a document. When the sponge member is deformed to some extent, a gap is generated between the image capturing module and the illumination module, which may reduce the dust proof performance.

An image forming apparatus having an image reading module having a reading frame, a reading guide, and a seal mechanism is disclosed. The seal mechanism includes a rib vertically provided in parallel with the slide direction of the reading guide and a dust proof sheet having flexibility and arranged so that its end comes into contact with the rib, and is configured to cover the gap of the reading frame and the reading guide (see Patent Japanese Laid-open Patent Publication No. 2012-39207).

An image reading apparatus causing image reading means to read an image of a document moving in document reading glass is disclosed. In the image reading apparatus, a slider for holding the document reading glass is held to be slidable in a sub-scanning direction along a feeding direction of a document by a holding module. In addition, a shield member is attached so as to shield a space portion between the holding module and the slider at the downstream side in the movement direction of the document (see Japanese Laid-open Patent Publication No. 2007-201888).

SUMMARY

In a document image capturing device having a module capable of moving, it is desired to further improve the dust proof performance while the load generated when the module is moved is maintained at a certain level.

The object is to improve, in a document image capturing device having a module capable of moving, the dust proof performance while the load generated when the module is moved is maintained at a certain level.

According to an aspect of the apparatus, there is provided a document image capturing device. The document image capturing device includes an image capturing module including an image capturing element for capturing an image of a document, and a first aperture portion, an illumination module movable between the image capturing module and a document conveying path and including a light source for illuminating the document and a second aperture portion, and a sealer for sealing between the first aperture portion and the second aperture portion regardless of movement of the illumination module. The sealer includes a first film attached to cover an entire periphery of the first aperture portion and a second film attached to cover an entire periphery of the second aperture portion, and the first aperture portion and the second aperture portion are arranged so that a reflection light from the document illuminated by the light source passes through the first aperture portion and the second aperture portion.

According to an aspect of the module, there is provided a sealer. The sealer includes a first film attached to cover an entire periphery of a first aperture portion of an image capturing module including an image capturing element for capturing an image of a document and a second film attached to cover an entire periphery of a second aperture portion of an illumination module including a light source illuminating the document. The circumference of the end portion of the first film and the circumference of the end portion of the second film are sealed so that a reflection light from the document illuminated by the light source passes through a central portion of the first film and a central portion of the second film.

Preferably, the circumference of the end portion of the first film and the circumference of the end portion of the second film are adhered directly.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, a document conveying apparatus according to an embodiment, will be described with reference to the drawings. However, it should be noted that the technical scope of the invention is not limited to these embodiments, and extends to the inventions described in the claims and their equivalents.

Figure 1:
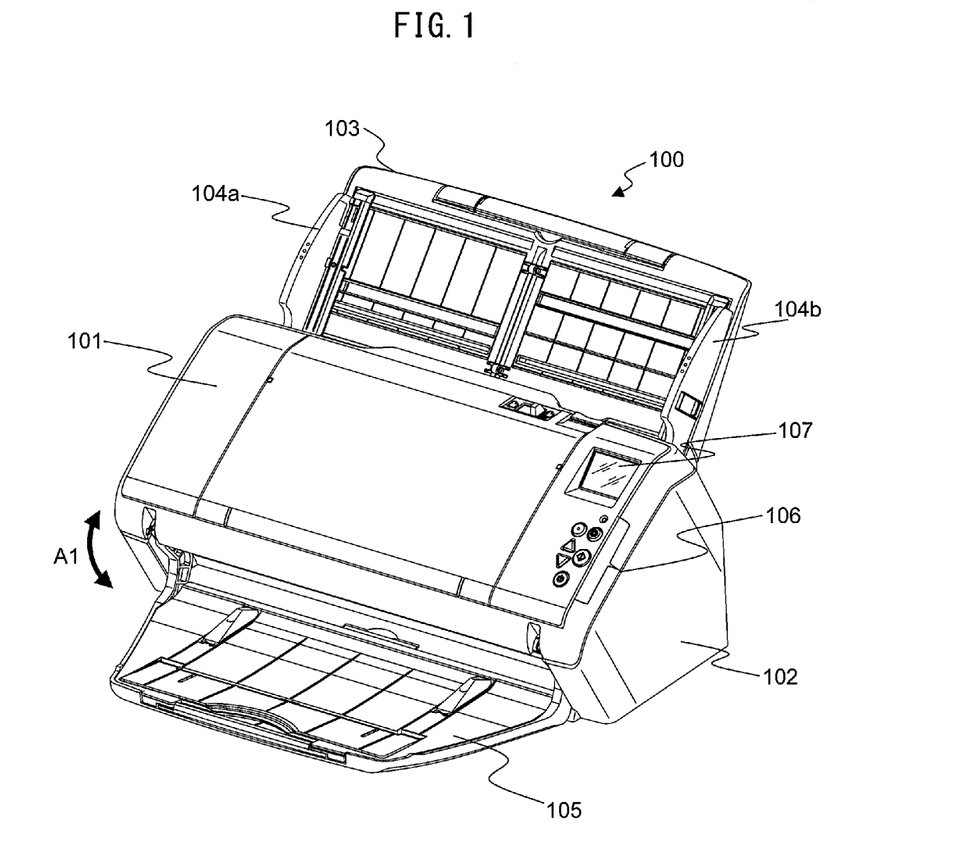
FIG. 1 is a perspective view illustrating a document conveying apparatus 100 according to an embodiment.

FIG. 1 is perspective view illustrating a document conveying apparatus 100 configured as an image scanner according to an embodiment.

The document conveying apparatus 100 is an example of an document image capturing apparatus. The document conveying apparatus 100 includes an upper side housing 101, a lower side housing 102, a document tray 103, a discharged sheet stacker 105, multiple operation buttons 106, a display device 107, etc.

The upper side housing 101 is arranged at a position to cover the upper surface of the document conveying apparatus 100, and is attached to the lower side housing 102 with a hinge so as to be able to open and close, at the time of a paper jam, at the time of cleaning of the document conveying apparatus 100, etc.

The document tray 103 is engaged with the lower side housing 102 in such a manner that the document can be placed on the document tray 103. The document tray 103 is provided with side guides 104a and 104b which can move in a direction perpendicular to the conveying direction of the document. Hereinafter, the side guides 104a and 104b may be collectively referred to as side guides 104.

The discharged sheet stacker 105 is attached to the lower side housing 102 with a hinge in such a manner that the discharged sheet stacker 105 can pivot in a direction indicated by arrow A1, and in the open state as depicted in FIG. 1, the discharged sheet stacker 105 can hold the discharged documents.

Each of the multiple operation buttons 106 is arranged on the surface of the upper side housing 101, and when the operation button 106 is pressed down, the operation button 106 generates and outputs an operation detection signal in accordance with the button.

The display device 107 includes a display constituted by a liquid crystal, an organic EL (Electro-Luminescence), etc., and an interface circuit for outputting image data to the display, and displays the image data to the display.

Figure 2:
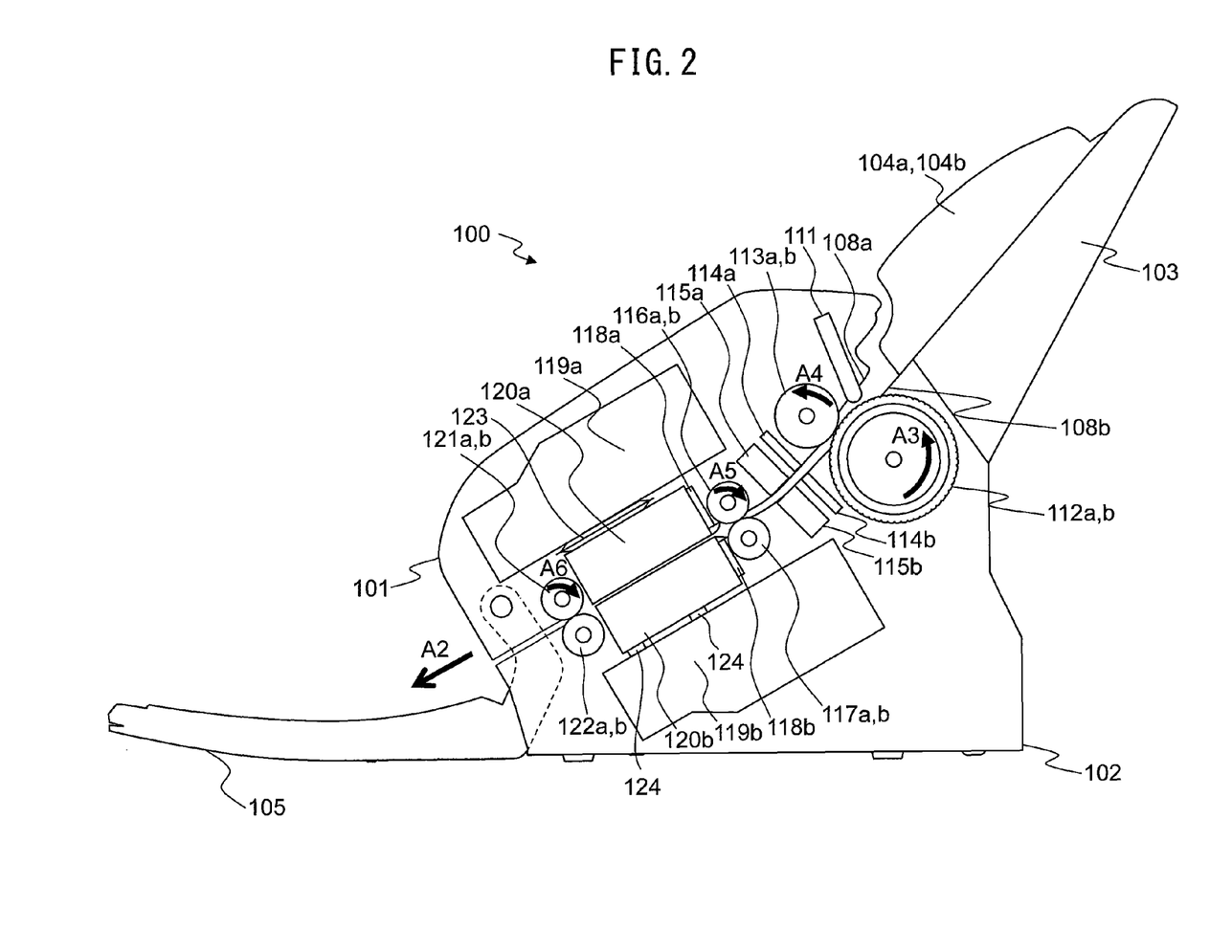
FIG. 2 is a figure for explaining a conveying path inside of the document conveying apparatus 100.

FIG. 2 is a figure for explaining a conveying path inside of the document conveying apparatus 100.

The conveying path inside of the document conveying apparatus 100 includes a contact sensor 111, feeding rollers 112a, 112b, brake rollers 113a, 113b, a first light emitter 114a, a first light receiver 114b, an ultrasonic transmitter 115a, an ultrasonic receiver 115b, first conveying rollers 116a, 116b, first driven rollers 117a, 117b, a second light emitter 118a, a second light receiver 118b, a first image capturing device 119a, a second image capturing device 119b, a first illumination device 120a, a second illumination device 120b, second conveying rollers 121a, 121b, second driven rollers 122a, 122b, etc.

In the following explanation, the feeding rollers 112a and 112b may be collectively referred to as the feeding roller 112. The brake rollers 113a and 113b may be collectively referred to as the brake roller 113. The first conveying rollers 116a and 116b may be collectively referred to as the first conveying roller 116. The first driven rollers 117a and 117b may be collectively referred to as the first driven roller 117. The second conveying rollers 121a and 121b may be collectively referred to as the second conveying roller 121. The second driven rollers 122a and 122b may be collectively referred to as the second driven roller 122.

The lower surface of the upper side housing 101 forms a upper side guide 108a of the conveying route for the documents, and the upper surface of the lower side housing 102 forms an lower side guide 108b of the conveying route for the documents. In FIG. 2, arrow A2 indicates the conveying direction of the documents. In the following explanation, the upstream means the upstream in the conveying direction A2 of the documents, and the downstream means the downstream in the conveying direction A2 of the documents.

The contact sensor 111 is provided at the upstream side with respect to the feeding roller 112 and the brake roller 113, and detects whether or not a document is placed on the document tray 103. The contact sensor 111 generates and outputs a first document detection signal of which signal value changes depending on a state in which the document is placed on the document tray 103 and a state in which the document is not placed on the document tray 103.

The first light emitter 114a and the first light receiver 114b are provided at the downstream side with respect to the feeding roller 112 and the brake roller 113 and at the upstream side with respect to the first conveying roller 116 and the first driven roller 117, and are arranged to face each other with the conveying route for the documents interposed therebetween. The first light emitter 114a emits light to the first light receiver 114b. The first light receiver 114b detects light emitted from the first light emitter 114a, and generates and outputs a second document detection signal which is an electric signal according to the detected light. More specifically, the second document detection signal is a signal of which signal value changes depending on a state in which a document exists between the first light emitter 114a and the first light receiver 114b and a state in which any document does not exist between the first light emitter 114a and the first light receiver 114b. Hereinafter, the first light emitter 114a and the first light receiver 114b may be collectively referred to as the first light sensor 114.

The ultrasonic transmitter 115a and the ultrasonic receiver 115b are arranged in proximity to the conveying route for the documents so as to face each other with the conveying route interposed therebetween. The ultrasonic transmitter 115a transmits an ultrasonic wave. On the other hand, the ultrasonic receiver 115b detects the ultrasonic wave that has been transmitted by the ultrasonic transmitter 115a and that has passed through a document, and generates and outputs an ultrasonic signal which is an electric signal according to the detected ultrasonic wave. In the following explanation, the ultrasonic transmitter 115a and the ultrasonic receiver 115b may be collectively referred to as the ultrasonic sensor 115.

The second light emitter 118a and the second light receiver 118b are provided at the downstream side with respect to the first conveying roller 116 and the first driven roller 117 and provided at the upstream side with respect to the first image capturing device 119a and the second image capturing device 119b, and are arranged to face each other with the conveying route for the documents interposed therebetween. The second light emitter 118a emits light to the second light receiver 118b. The second light receiver 118b detects light emitted from the second light emitter 118a, and generates and outputs a third document detection signal which is an electric signal according to the detected light. More specifically, the third document detection signal is a signal of which signal value changes depending on a state in which a document exists between the second light emitter 118a and the second light receiver 118b and a state in which any document does not exist between the second light emitter 118a and the second light receiver 118b. Hereinafter, the second light emitter 118a and the second light receiver 118b may be collectively referred to as the second light sensor 118.

The first image capturing device 119a is an example of an image capturing module. The first image capturing device 119a includes an image capturing sensor of a reduced optical system type having an image capturing device based on CCD (Charge Coupled Device) arranged in a linear manner in a main scanning direction. This image capturing sensor reads the back surface of the document, and generates and outputs an analog image signal. Likewise, the second image capturing device 119b includes an image capturing sensor of a reduced optical system type based on CCD arranged in the linear manner in the main scanning direction. This image capturing sensor generates and outputs an analog image signal by reading the front surface of the document. It should be noted that only one of the first image capturing device 119a and the second image capturing device 119b may be provided to read only one of the surfaces of a document. Alternatively, it may possible to use a CIS (Contact Image Sensor) of the same-size optical system type having an image capturing device based on CMOS (Complementary Metal Oxide Semiconductor) instead of the CCD. Hereinafter, the first image capturing device 119a and the second image capturing device 119b may be collectively referred to as the image capturing device 119.

The first illumination device 120a is an example of an illumination module. The first illumination device 120a includes a light source for illuminating the back surface of a document and a backing that is used for the front surface of the document, and is arranged at a position between the first image capturing device 119a and the document conveying route so that the first illumination device 120a faces the second image capturing device 119b. Likewise, the second illumination device 120b includes a light source for illuminating the front surface of a document and a backing that is used for the back surface of the document, and is arranged at a position between the second image capturing device 119b and the document conveying route so that the second illumination device 120b faces the first image capturing device 119a. Hereinafter, the first illumination device 120a and the second illumination device 120b may be collectively referred to as the illumination device 120.

A first dust proof module 123 is provided between the first image capturing device 119a and the first illumination apparatus 120a, and a second dust proof module 124 is provided between the second image capturing device 119b and the second illumination apparatus 120b. A first dust proof module 123 is an example of a sealer.

When the feeding roller 112 rotates in the direction indicated by arrow A3 of FIG. 2, the document placed on the document tray 103 is conveyed between the upper side guide 108a and the lower side guide 108b in the document conveying direction A2. While the document is conveyed, the brake roller 113 rotates in the direction of the arrow A4 of FIG. 2. When multiple documents are placed on the document tray 103, only one of the documents placed on the document tray 103 that is in contact with the feeding roller 112 is separated with the action of the feeding roller 112 and the brake roller 113. Therefore, this operates so as to limit the conveying of a document other than the separated document (prevention of multifeed). The feeding roller 112 and the brake roller 113 functions as a separation module for a document.

The document is fed between the first conveying roller 116 and the first driven roller 117 while the document is guided by the upper side guide 108a and the lower side guide 108b. When the first conveying roller 116 rotates in the direction of the arrow A5 of FIG. 2, the document is fed between the first image capturing device 119a and the second image capturing device 119b. When the second conveying roller 121 rotates in the direction of the arrow A6 of FIG. 2, the document, which has been read by the image capturing device 119, is discharged onto the discharged sheet stacker 105.

Figure 3:
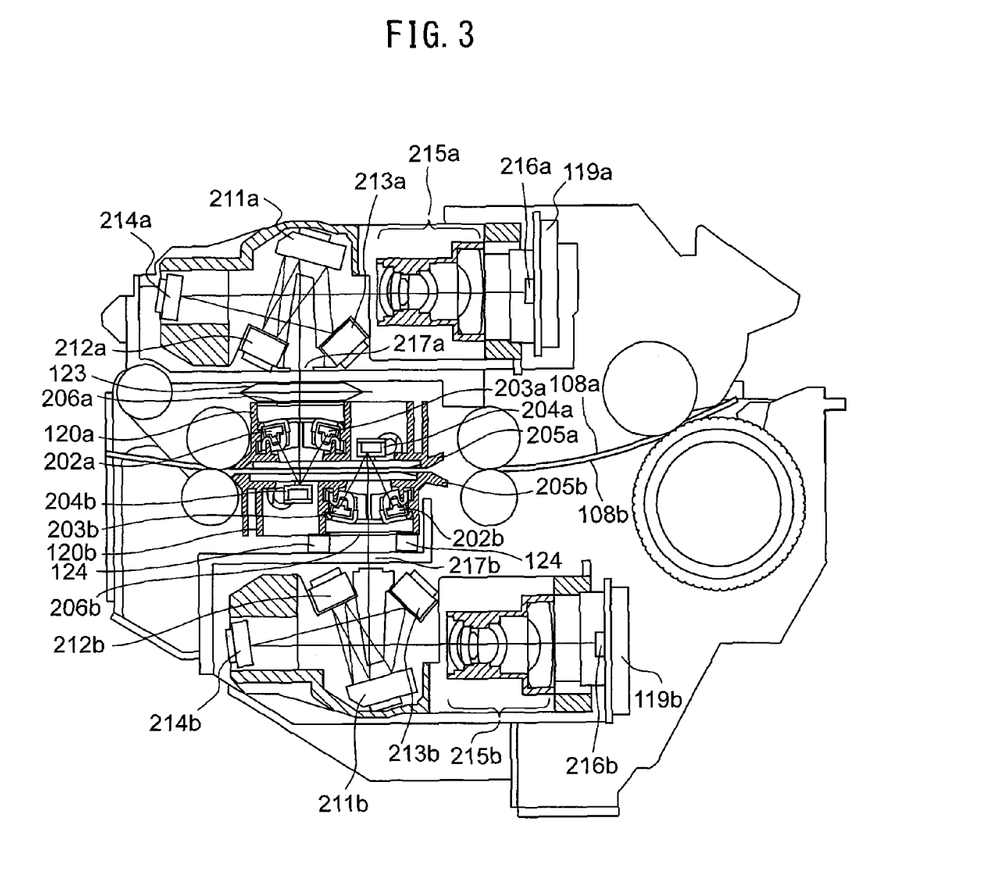
FIG. 3 is a schematic diagram for explaining a first dust proof module 123.

FIG. 3 is a schematic diagram for explaining the image capturing device 119, the illumination apparatus 120, the first dust proof module 123, and the second dust proof module 124.

As shown in FIG. 3, the first illumination apparatus 120a is provided between the first image capturing device 119a and the document conveying path in such a manner that the first illumination apparatus 120a is movable in a direction perpendicular to the document conveying path. A force is applied to the first illumination apparatus 120a by its own weight toward the second illumination apparatus 120b. The first illumination apparatus 120a includes first light sources 202a, 203a, a first backing 204a, a first guide 205a, etc. The first guide 205a guides the conveyed document to between the first illumination apparatus 120a and the second illumination apparatus 120b.

The second illumination apparatus 120b is provided between the second image capturing device 119b and the document conveying path in such a manner that the second illumination apparatus 120b is fixed to the housing of the document conveying apparatus 100. The second illumination apparatus 120b includes second light sources 202b, 203b, a second backing 204b, a second guide 205b, etc. The second guide 205b guides the conveyed document to between the first illumination apparatus 120a and the second illumination apparatus 120b.

The first image capturing device 119a is provided above the first illumination apparatus 120a in such a manner that the first image capturing device 119a is fixed to the housing of the document conveying apparatus 100. The first image capturing device 119a includes first mirrors 211a to 214a, a first lens group 215a, a first image capturing element 216a, etc. The light reflected from the first light sources 202a, 203a is reflected by the conveyed document or the second backing 204b, and the light passes the first mirrors 211a to 214a, and the first lens group 215a, and forms an image on the first image capturing element 216a.

The second image capturing device 119b is provided below the second illumination apparatus 120b in such a manner that the second image capturing device 119b is fixed to the housing of the document conveying apparatus 100. The second image capturing device 119b includes second mirrors 211b to 214b, a second lens group 215b, a second image capturing element 216b, etc. The light emitted from the second light sources 202b, 203b is reflected by the conveyed document or the first backing 204a, and the light passes the second mirrors 211b to 214b and the second lens group 215b, and forms an image on the second image capturing element 216b.

The first image capturing device 119a has a first aperture portion 217a in the surface facing the first illumination apparatus 120a in such a manner that the first aperture portion 217a is arranged to pass the reflection light from the document illuminated by the first light source 202a. The first illumination apparatus 120a has a second aperture portion 206a in the surface facing the first image capturing device 119a in such a manner that the second aperture portion 206a is arranged to pass the reflection light from the document illuminated by the first light source 202a. Likewise, the second image capturing device 119b has a third aperture portion 217b in the surface facing the second illumination apparatus 120b in such a manner that the third aperture portion 217b is arranged to pass the reflection light from the document illuminated by the second light source 202b. The second illumination apparatus 120b has a fourth aperture portion 206b in the surface facing the second image capturing device 119b in such a manner that the fourth aperture portion 206b is arranged to pass the reflection light from the document illuminated by the second light source 202b.

The first dust proof module 123 is provided between the first image capturing device 119a and the first illumination apparatus 120a. The first dust proof module 123 seals between the first aperture portion 217a of the first image capturing device 119a and the second aperture portion 206a of the first illumination apparatus 120a. More specifically, the first dust proof module 123 seals the space between the first aperture portion 217a and the second aperture portion 206a. The first dust proof module 123 is movable with the film, and regardless of the movement of the first illumination apparatus 120a, the first dust proof module 123 seals between the first aperture portion 217a and the second aperture portion 206a. The film is made of, for example, a material having a grade equal to or more than UL94 VTM-2 defined by the UL (Underwriters Laboratories) standard defining the flame retardant property. Therefore, this can alleviate occurrence of the effect given to the surrounding by the light emitted from the first light source 202a.

On the other hand, the second dust proof module 124 is provided between the second image capturing device 119b and the second illumination apparatus 120b. The second dust proof module 124 seals between the third aperture portion 217b of the second image capturing device 119b and the fourth aperture portion 206b of the second illumination apparatus 120b. The second image capturing device 119b and the second illumination apparatus 120b are fixed and do not move, and therefore, the second dust proof module 124 is formed to be fixed with a sponge, and seals between the third aperture portion 217b and the fourth aperture portion 206b.

Figure 4A:
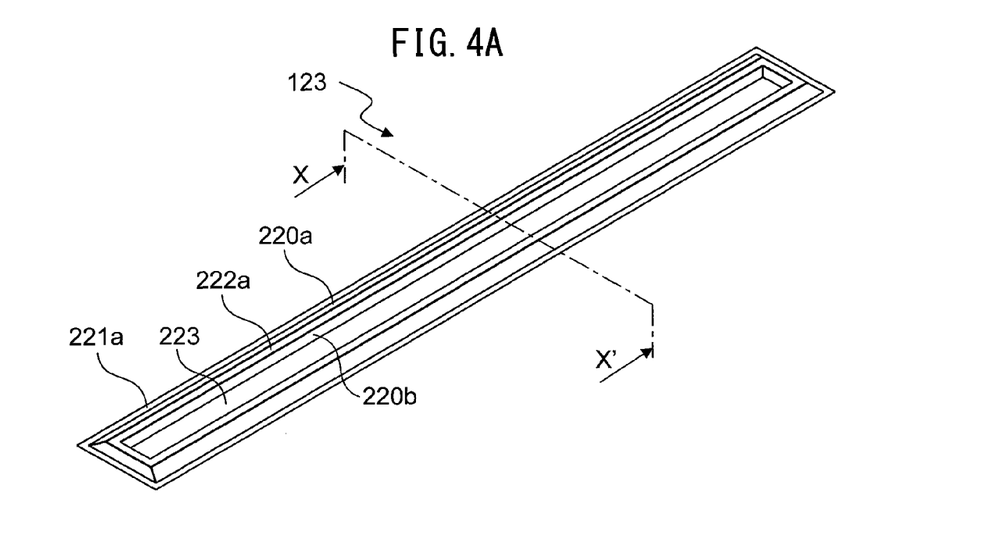
FIG. 4A is a perspective view illustrating the first dust proof module 123.
Figure 4B:
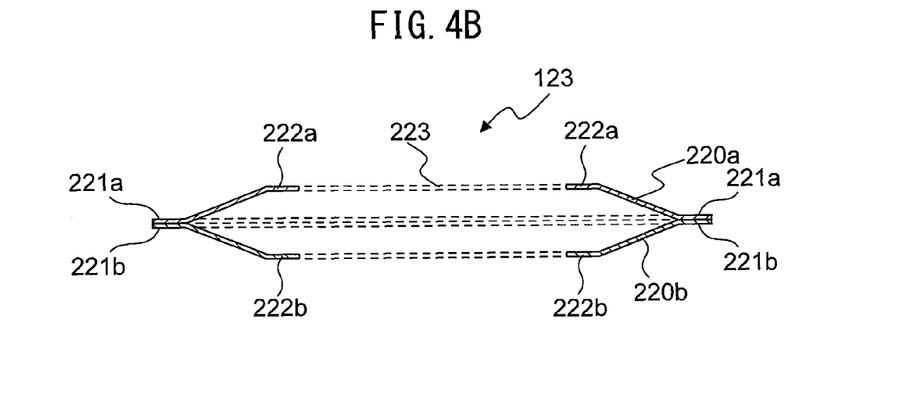
FIG. 4B is a cross sectional view illustrating the first dust proof module 123 in an expanded state.
Figure 4C:
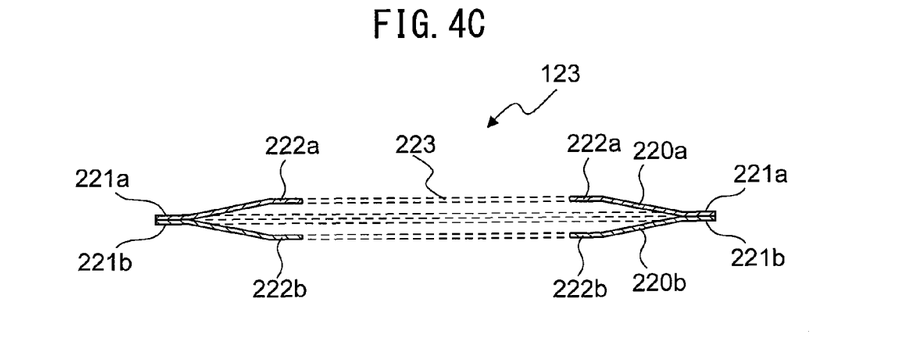
FIG. 4C is a cross sectional view illustrating the first dust proof module 123 in a narrowed state.

FIG. 4A is a perspective view illustrating the first dust proof module 123. FIG. 4B is a cross sectional view illustrating the first dust proof module 123 in the expanded state (in the state in which the first illumination apparatus 120a is descended). FIG. 4C is a cross sectional view illustrating the first dust proof module 123 in the narrowed state (in the state in which the first illumination apparatus 120a is raised). FIGS. 4B and 4C illustrate figures seen in the direction of arrows X, X' from the position where the first dust proof module 123 at the arrows X-X' of FIG. 4A.

As shown in FIGS. 4A to 4C, the first dust proof module 123 includes a first film 220a and a second film 220b. The first film 220a and the second film 220b are in a flat surface shape of a rectangle having the aperture portion 223 in the rectangle shape (hollow square shape). Since the first film 220a and the second film 220b are in the hollow square shape, the first film 220a and the second film 220b can be formed easily at a low cost. It should be noted that the external shapes of the first film 220a and the second film 220b and the aperture portion 223 may be formed in a shape other than the square shape, such as a circular shape, a triangular shape, a wave like shape, etc. The aperture portion 223 is an example of a central portion of the first film 220a and the second film 220b.

The first film 220a and the second film 220b are attached to each other by welding along the external periphery 221a of the first film 220a and the external periphery 221b of the second film 220b. More specifically, the circumference of the end portion of the first film 220a and the circumference of the end portion of the second film 220b are adhered directly. On the other hand, double-sided tapes are attached to the first film 220a and the second film 220b along the inner periphery 222a of the first film 220a and the inner periphery 222b of the second film 220b. With the double-sided tapes, the first film 220a is attached to the first image capturing device 119a, and the second film 220b is attached to the first illumination apparatus 120a. Accordingly, the circumference of the end portion of the first film 220a and the circumference of the end portion of the second film 220b are sealed so that the reflection light from the document illuminated by the first light source 202a passes through the aperture portion 223 of the first film 220a and the second film 220b.

The external periphery 221a of the first film 220a and the external periphery 221b of the second film 220b are pasted in advance by welding, and therefore, a worker who does the assembly work can easily handle the first dust proof module 123. Accordingly, the worker can easily attach the first dust proof module 123 to the first image capturing device 119a and the first illumination apparatus 120a.

It should be noted that the inner periphery 222a of the first film 220a and the inner periphery 222b of the second film 220b can be attached to the first image capturing device 119a and the first illumination apparatus 120a with an adhesion agent other than the double-sided tape such as an adhesive agent.

Figure 5:
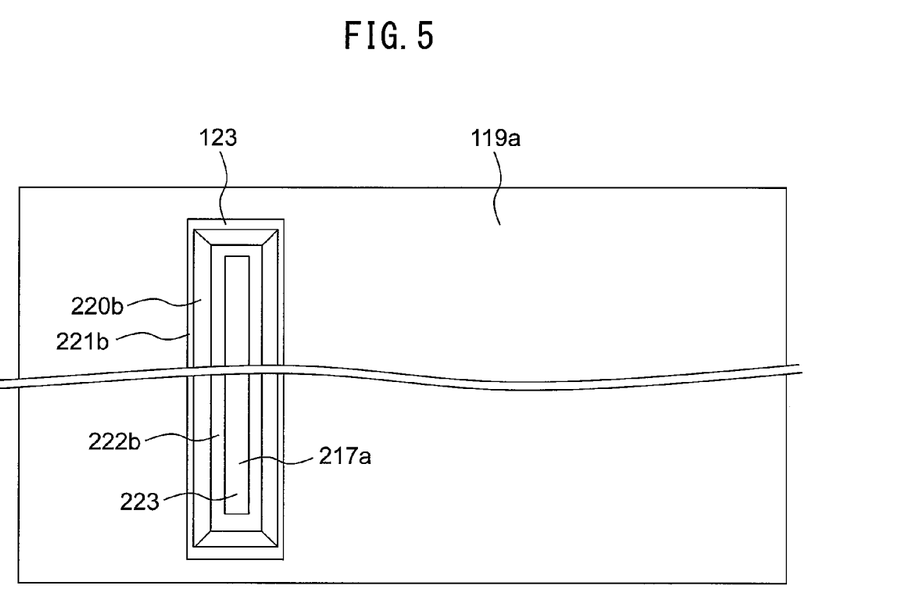
FIG. 5 is a figure illustrating a first image capturing device 119a when seen from a lower surface side.

FIG. 5 is a figure illustrating first image capturing device 119a having the first dust proof module 123 attached to the lower surface thereof when seen from the lower surface side.

As shown in FIG. 5, the inner periphery 222a of the first film 220a existing at the position facing the inner periphery 222b of the second film 220b is attached to the first image capturing device 119a along the first aperture portion 217a. Therefore, the first film 220a is attached to cover the entire periphery of the first aperture portion 217a. Likewise, the inner periphery 222b of the second film 220b is attached to the first illumination apparatus 120a along the second aperture portion 206a. Therefore, the second film 220b is attached to cover the entire periphery of the second aperture portion 206a.

Figure 6A:
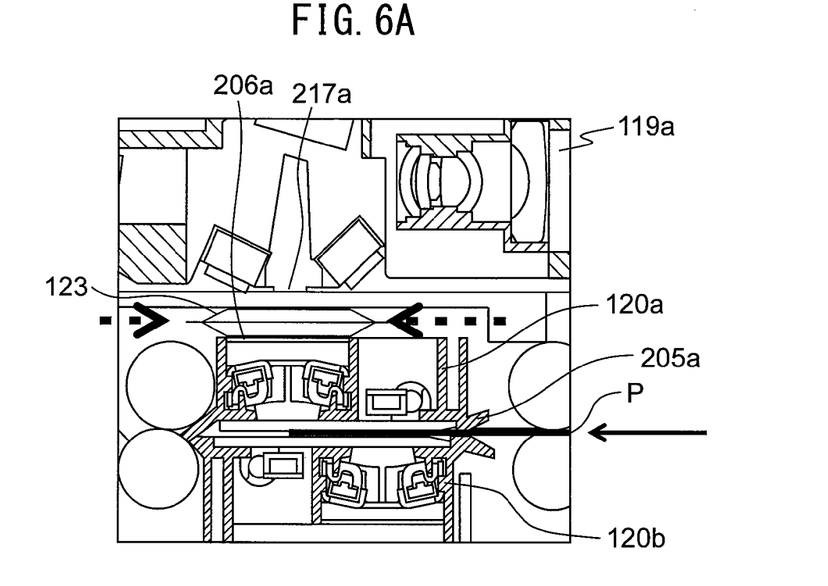
FIG. 6A is a cross sectional view illustrating the first dust proof module 123, etc., when PPC paper is conveyed.
Figure 6B:
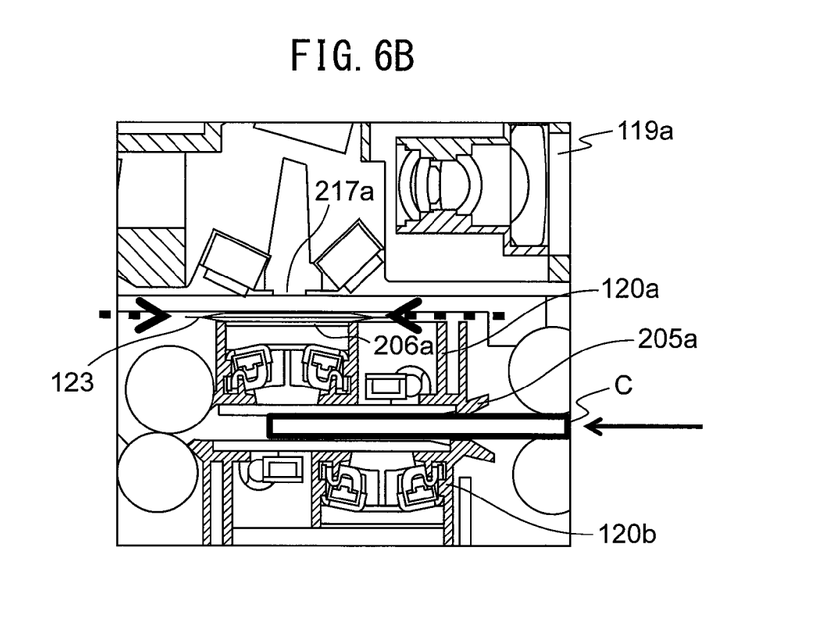
FIG. 6B is a cross sectional view illustrating the first dust proof module 123, etc., when a card is conveyed.
Figure 7A:
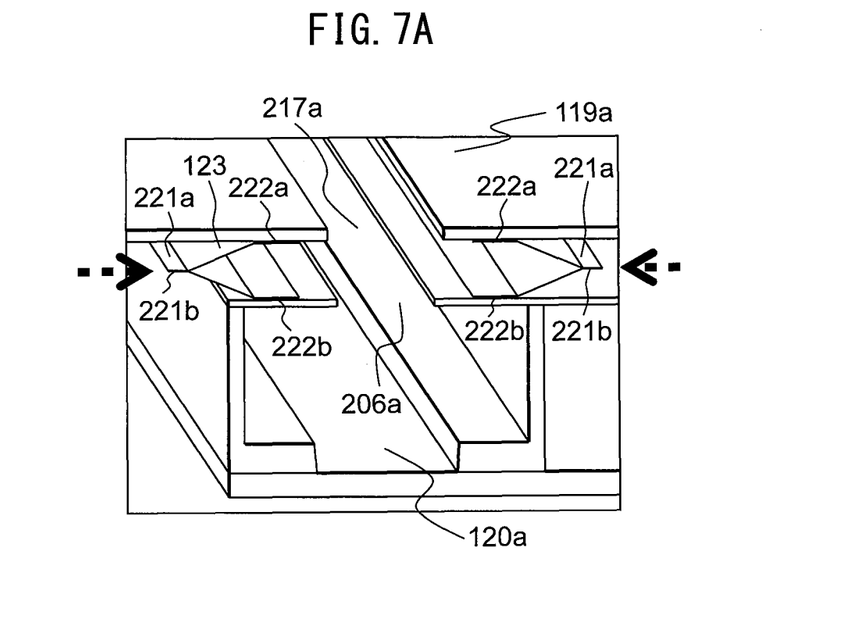
FIG. 7A is a perspective view illustrating the first dust proof module 123, etc., in the state of FIG. 6A.
Figure 7B:
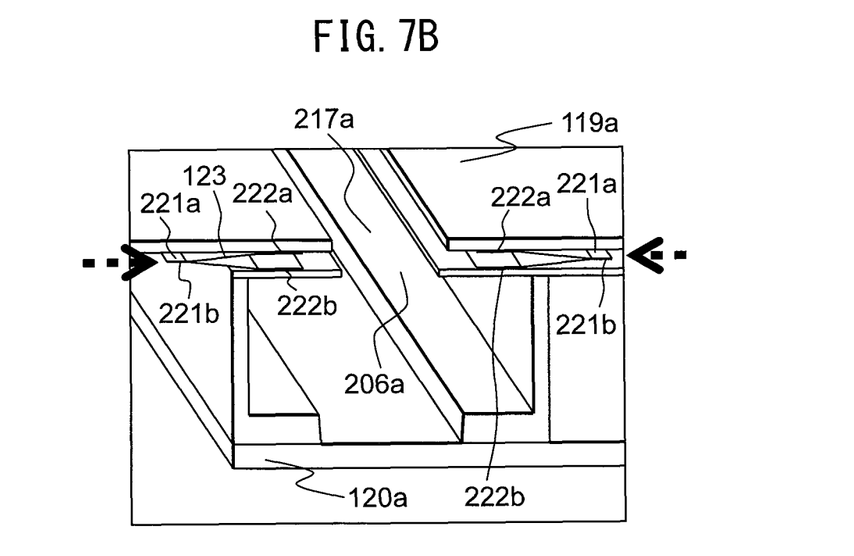
FIG. 7B is a perspective view illustrating the first dust proof module 123, etc., in the state of FIG. 6B.

FIG. 6A is a cross sectional view illustrating the first image capturing device 119a, the first illumination apparatus 120a, and the first dust proof module 123 in such state that PPC paper is conveyed. FIG. 6B is a cross sectional view illustrating the first image capturing device 119a, the first illumination apparatus 120a, and the first dust proof module 123 in such state that a card is conveyed. FIG. 7A is a perspective view illustrating a cross section of the first image capturing device 119a, the first illumination apparatus 120a, and the first dust proof module 123 in the state of FIG. 6A. FIG. 7B is a perspective view illustrating a cross section of the first image capturing device 119a, the first illumination apparatus 120a, and the first dust proof module 123 in the state of FIG. 6B.

As shown in FIG. 6A, in the state where paper P such as PPC paper is conveyed between the first illumination apparatus 120a and the second illumination apparatus 120b (or in the state where any paper is not conveyed), the first illumination apparatus 120a descends by its own weight, and the first dust proof module 123 expands in the vertical direction. However, as shown in FIG. 7A, the entire periphery of the first aperture portion 217a and the second aperture portion 206a are covered by the first dust proof module 123. For this reason, as indicated by dotted lines in FIGS. 6A and 7A, the dust entering from the document conveying path is prevented from entering into the inside of the first image capturing device 119a and the first illumination apparatus 120a.

On the other hand, as shown in FIG. 6B, in the state where a card D is conveyed between the first illumination apparatus 120a and the second illumination apparatus 120b, the first guide 205a is pushed up by the card C, and the first illumination apparatus 120a is raised integrally with the first guide 205a. In this case, as compared with the state as shown in FIG. 6A, the first dust proof module 123 is narrowed in the vertical direction. However, as shown in FIG. 7B, the entire periphery of the first aperture portion 217a and the second aperture portion 206a is covered by the first dust proof module 123. Therefore, as indicated by dotted lines in FIGS. 6B and 7B, the dust entering from the document conveying path is prevented from entering into the inside of the first image capturing device 119a and the first illumination apparatus 120a.

As described above, the first dust proof module 123 is made into a pouch shape with a flexible and thin film material, and therefore, regardless of the movement of the first illumination apparatus 120a, the space between the first image capturing device 119a and the first illumination apparatus 120a can be completely sealed.

When the first illumination apparatus 120a moves, there is a change in the angle of the portion where the first film 220a and the second film 220b are adhered, but the first film 220a and the second film 220b themselves are not deformed. Therefore, even if the first illumination apparatus 120a is repeatedly moved, the load generated during movement of the first illumination apparatus 120a by the first dust proof module 123 does not change, and documents can be continuously conveyed in a correct manner. Further, even if the first illumination apparatus 120a is repeatedly moved, the first film 220a and the second film 220b are not deformed and are less likely to be damaged, and therefore, the space between the first image capturing device 119a and the first illumination apparatus 120a can be continuously sealed.

The first dust proof module 123 is formed such that the first film 220a and the second film 220b are aligned and laid in the direction in which the first illumination apparatus 120a moves, and are pasted at the external periphery portion, so that the first dust proof module 123 is formed to be extendable and shrinkable in the direction in which the first illumination apparatus 120a moves. Therefore, when the first illumination apparatus 120a moves, the load given to the first illumination apparatus 120a by the first dust proof module 123 can be reduced, and this can prevent reduction in the mobility of the first illumination apparatus 120a.

Likewise, the load given to the first dust proof module 123 by the first illumination apparatus 120a when the first illumination apparatus 120a is moved is also reduced, and therefore, this can alleviate the damage of the first dust proof module 123. Further, the load given to the bonding portion of the first dust proof module 123 and the first image capturing device 119a or the first illumination apparatus 120a when the first illumination apparatus 120a is moved is also reduced. Therefore, this can also make it less likely for the first dust proof module 123 to peel off from the first image capturing device 119a or the first illumination apparatus 120a.

The first dust proof module 123 has a flat surface shape, and is arranged in the gap between the first image capturing device 119a and the first illumination apparatus 120a. Therefore, it is not necessary to ensure a large space inside of the document conveying apparatus 100 to provide the first dust proof module 123, and therefore, the space in the apparatus can be reduced.

The first dust proof module 123 is preferably formed with a sufficient margin so that the first film 220a and the second film 220b are not over extended even when the first illumination apparatus 120a is at the lowermost position. Therefore, even when vibration, etc., is applied to the document conveying apparatus 100, and the first illumination apparatus 120a moves in the horizontal direction with respect to the document conveying path, the first dust proof module 123 can continue to seal between the first image capturing device 119a and the first illumination apparatus 120a.

On the other hand, as shown in FIG. 3, the second dust proof module 124 formed to be fixed with the sponge is used to seal between the second image capturing device 119b and the second illumination apparatus 120b which are fixed and do not move, and therefore, the dust proof performance can be improved simply with a low cost.

Figure 8:
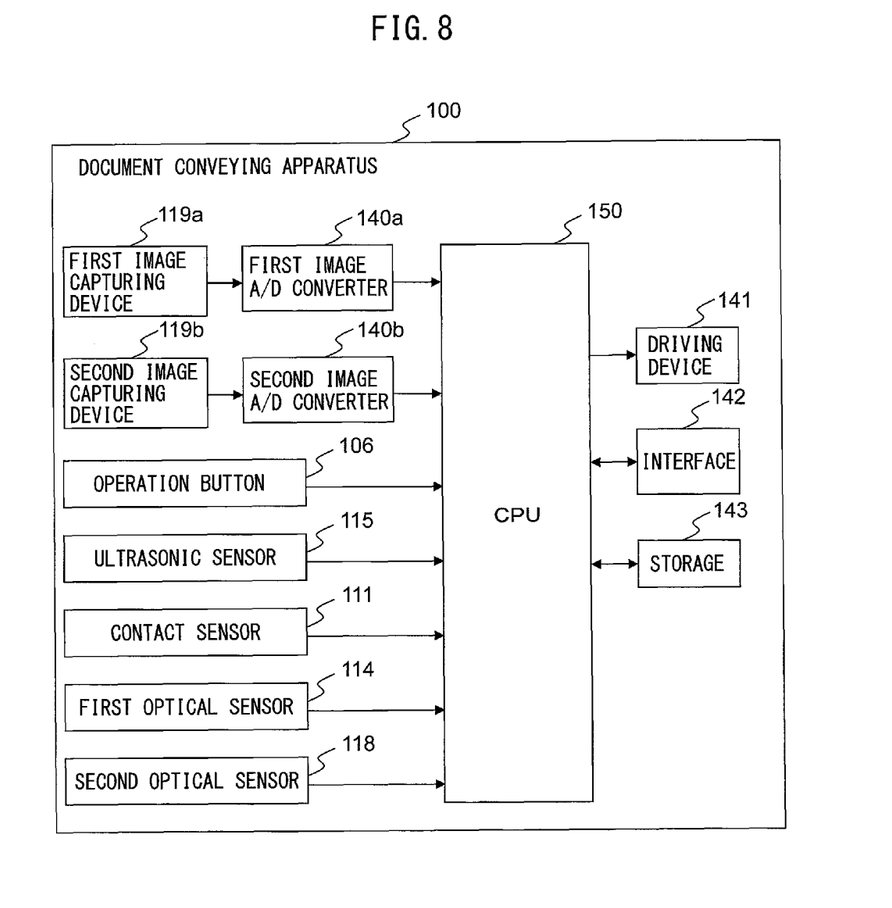
FIG. 8 is a block diagram illustrating a schematic configuration of a document conveying apparatus 100.

FIG. 8 is a block diagram illustrating a schematic configuration of the document conveying apparatus 100.

The document conveying apparatus 100 includes not only the configuration described above but also a first A/D convertor 140a, a second A/D convertor 140b, a driving apparatus 141, an interface 142, a storage 143, a CPU (Central Processing Unit) 150, etc.

The first A/D converter 140a performs analog digital conversion to convert an analog image signal which is output from the first image capturing device 119a, and generate digital image data, and outputs the digital image data to the CPU 150. Likewise, the second A/D converter 140b performs analog digital conversion to convert an analog image signal which is output from the second image capturing device 119b, and generate digital image data, and outputs the digital image data to the CPU 150. These digital image data are used as read image. Hereinafter, the first A/D converter 140a and the second A/D converter 140b may be collectively referred to as the A/D converter 140.

The interface 142 includes, for example, an interface circuit based on a serial bus such as USB, and electrically connects with an information processing apparatus, not shown (for example, a personal computer, a portable information terminal, etc.), and transmits and receives read images and various kinds of information. Instead of the interface 142, an antenna for transmitting and receiving a wireless signal and a communication module having a wireless communication interface circuit for transmitting and receiving a signal via a wireless communication circuit in accordance with a predetermined communication protocol may be used. The predetermined communication protocol may be, for example, a wireless LAN (Local Area Network).

The storage 143 includes memory devices such as a RAM (Random Access Memory), a ROM (Read Only Memory), etc., a fixed disk device such as a hard disk, or a portable storage device such as a flexible disk, an optical disk, etc. The storage 143 stores computer programs, databases, tables, etc., used for various kinds of processing of the document conveying apparatus 100. The computer program may be installed on the storage 143 from a computer-readable, non-transitory medium such as a compact disk read only memory (CD-ROM), a digital versatile disk read only memory (DVD-ROM), etc., by using a well-known setup program, etc. Further, the storage 143 stores the read images.

The CPU 150 operates based on a program stored in the storage 143 in advance. Alternatively, a DSP (digital signal processor), an LSI (large scale integration), etc., may be used instead of the CPU 150. As another alternative, an ASIC (Application Specific Integrated Circuit), an FPGA (Field-Programming Gate Array), etc., may be used instead of the CPU 150.

The CPU 150 is connected to the operation button 106, the contact sensor 111, the first light sensor 114, the ultrasonic sensor 115, the second light sensor 118, the first image capturing device 119a, the second image capturing device 119b, the first A/D converter 140a, the second A/D converter 140b, the pulse signal generation circuit 230, the driving device 141, the interface 142, the storage 143, etc., and controls each of these modules. The CPU 150 performs driving control of the driving device 141, document reading control of the image capturing device 119, etc., and obtains read images.

As described above in details, the first dust proof module 123 made of the film seals between the first aperture portion 217a of the first image capturing device 119a and the second aperture portion 206a of the first illumination apparatus 120a regardless of the movement of the first illumination apparatus 120a. Therefore, the document conveying apparatus 100 can more greatly improve the dust proof performance while the load related to the movement of the first illumination apparatus 120a is maintained at a certain level.

Therefore, this can prevent the dust from being accumulated inside of the first image capturing device 119a or the first illumination apparatus 120a, and can alleviate occurrence of vertical streak noise, etc., in the read image, occurrence of determination error of a copping area of an image, etc. Therefore, the time and the cost required for repair and maintenance of the first image capturing device 119a and the first illumination apparatus 120a can also be reduced. Even if the first illumination apparatus 120a is repeatedly moved, the load generated by the first dust proof module 123 when the first illumination apparatus 120a is moved does not change, and therefore, the document conveying apparatus 100 can continue to correctly convey documents. Further, even when the first illumination apparatus 120a is repeatedly moved, the first film 220a and the second film 220b are not deformed, and therefore, the document conveying apparatus 100 can continue to seal between the first image capturing device 119a and the first illumination apparatus 120a.

Figure 9A:
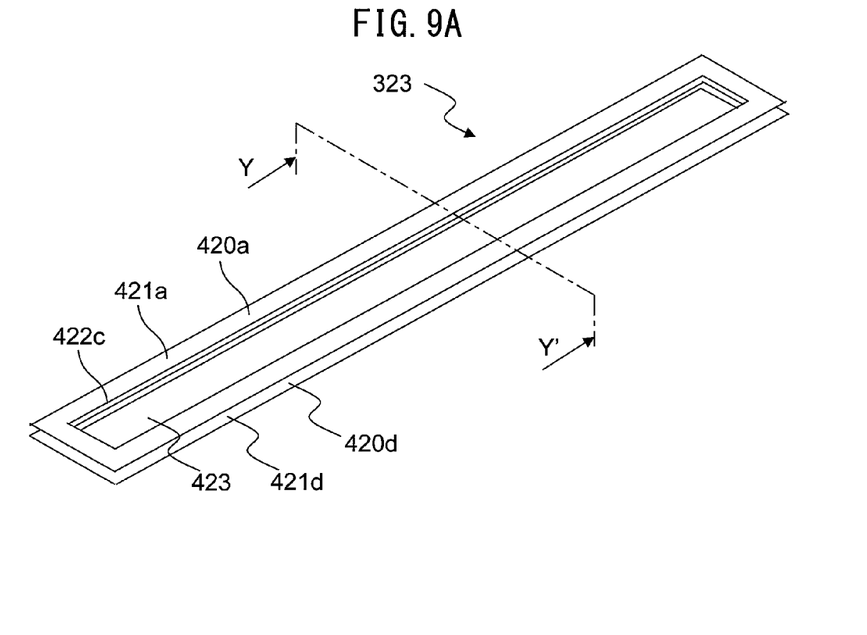
FIG. 9A is a figure for explaining another configuration of a first dust proof module.
Figure 9B:
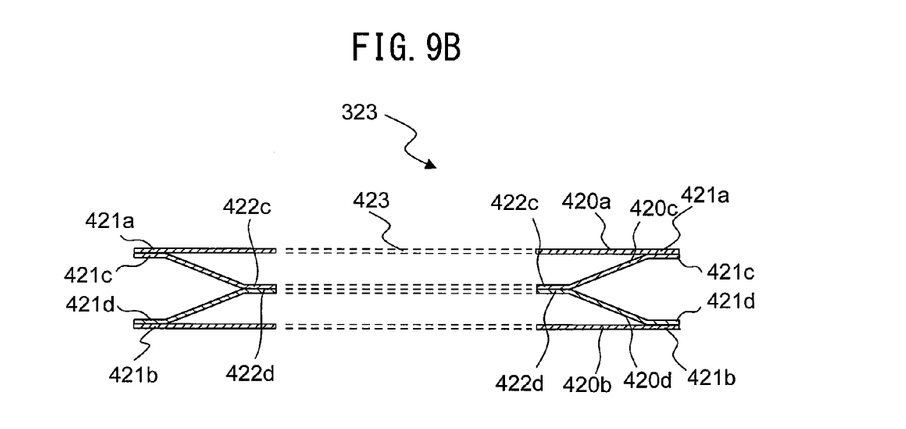
FIG. 9B is a figure for explaining another configuration of the first dust proof module.

FIGS. 9A and 9B are figures for explaining another configuration of a first dust proof module. FIG. 9A is a perspective view illustrating a first dust proof module 323. FIG. 9B is a cross sectional view illustrating the first dust proof module 323 in the expanded state (in the state where the first illumination apparatus 120a is lowered).

The first dust proof module 323 as shown in FIGS. 9A, 9B is used instead of the first dust proof module 123. As shown in FIGS. 9A, 9B, the first dust proof module 323 includes a first film 420a, a second film 420b, a third film 420c, and a fourth film 420d. The first film 420a, the second film 420b, the third film 420c, and the fourth film 420d are in a hollow square shape.

The first film 420a and the third film 420c are attached to each other by welding along the external periphery 421a of the first film 420a and the external periphery 421c of the third film 420c. The third film 420c and the fourth film 420d are attached to each other by welding along the inner periphery 422c of the third film 420c and the inner periphery 422d of the fourth film 420d. The fourth film 420d and the second film 420b are attached to each other by welding along the external periphery 421d of the fourth film 420d and the external periphery 421b of the second film 420b.

On the other hand, double-sided tapes are attached to the surface of the first film 420a and the second film 420b which is at the side not adhered to the third film 420c and the fourth film 420d. With the double-sided tapes, the first film 420a is attached to the first image capturing device 119a along the first aperture portion 217a, and the second film 420b is attached to the first illumination apparatus 120a along the second aperture portion 206a. Therefore, the first film 420a is attached to cover the entire periphery of the first aperture portion 217a, and the second film 420b is attached to cover the entire periphery of the second aperture portion 206a.

As described above, the first dust proof module 323 seals the circumference of the end portion of the first film 420a, the second film 420b, the third film 420c, and the fourth film 420d. The reflection light from the document illuminated by the first light sources 202a, 203a passes through the aperture portion 423 of the first film 420a, the second film 420b, the third film 420c, and the fourth film 420d.

In the first dust proof module 323, the first film 420a and the second film 420b may be omitted. In this case, double-sided tapes are attached to the third film 420c and the fourth film 420d along the external periphery 421c of the third film 420c and the external periphery 421d of the fourth film 420d. With the double-sided tapes, the third film 420c is attached to the first image capturing device 119a, and the fourth film 420d is attached to the first illumination apparatus 120a.

As described above, the first dust proof module 323 made of the film also seals between the first aperture portion 217a of the first image capturing device 119a and the second aperture portion 206a of the first illumination apparatus 120a regardless of the movement of the first illumination apparatus 120a. Therefore, the document conveying apparatus 100 can more greatly improve the dust proof performance while the load related to the movement of the first illumination apparatus 120a is maintained at a certain level.

However, in the first dust proof module 123, the two films are adhered at the external periphery portion, and the two films are closed, which makes it difficult to receive force from the external side. On the other hand, in the first dust proof module 323, the third film 420c and the fourth film 420d are open at the external periphery portion, which makes it easy to receive force from the external side. As a result, the first dust proof module 323 is more likely to be torn off than the first dust proof module 123, and from the viewpoint of the strength, the structure of the first dust proof module 123 is more preferable than the structure of the first dust proof module 323.

The dust proof module made of the film covers the entire periphery of the aperture portion of the image capturing module and the aperture portion of the illumination module, and therefore, the space between the aperture portion of the image capturing module and the aperture portion of the illumination module are sealed regardless of the movement of the illumination module. Therefore, the document image capturing device can more greatly improve the dust proof performance while the load generated during the movement of the illumination module is maintained at a certain level.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A document image capturing device comprising:
   an image capturing module including an image capturing element for capturing an image of a document, and a first aperture portion;
   an illumination module movable between the image capturing module and a document conveying path and including a light source for illuminating the document and a second aperture portion; and
   a sealer for sealing between the first aperture portion and the second aperture portion regardless of a movement of the illumination module,
   wherein the sealer includes a first film attached thereto to cover an entire periphery of the first aperture portion and a second film attached thereto to cover an entire periphery of the second aperture portion, and
   the first aperture portion and the second aperture portion are arranged so that a reflection light from the document, illuminated by the light source, passes through the first aperture portion and the second aperture portion.

2. The document image capturing device according to claim 1, wherein the first film and the second film are in a rectangular shape.

3. The document image capturing device according to claim 1, wherein the image capturing module is fixed to a housing of the document image capturing device.

4. The document image capturing device according to claim 1, wherein the first film and the second film are attached to the image capturing module and the illumination module along the first aperture portion and the second aperture portion, respectively, and are attached to each other along the external peripheries of the first film and the second film.

5. The document image capturing device according to claim 1, wherein the first film and the second film are attached to the image capturing module and the illumination module, respectively, with an adhesion agent, and are attached to each other by welding.

* * * * *